United States Patent
Okajima et al.

(10) Patent No.: US 9,262,314 B2
(45) Date of Patent: Feb. 16, 2016

(54) DATA TRANSFER DEVICE

(71) Applicant: FUJITSU SEMICONDUCTOR LIMITED, Yokohama-shi, Kanagawa (JP)

(72) Inventors: Yusuke Okajima, Kasugai (JP); Gen Tsukishiro, Kasugai (JP); Chihiro Sekiya, Kasugai (JP); Seiji Minoura, Kasugai (JP)

(73) Assignee: Socionext, Inc., Yokohama (JP)

( * ) Notice: Subject to any disclaimer, the term of this patent is extended or adjusted under 35 U.S.C. 154(b) by 413 days.

(21) Appl. No.: 13/968,984

(22) Filed: Aug. 16, 2013

(65) Prior Publication Data

US 2014/0059317 A1 Feb. 27, 2014

(30) Foreign Application Priority Data

Aug. 21, 2012 (JP) ................................. 2012-182545

(51) Int. Cl.
*G06F 12/02* (2006.01)
*G06F 5/06* (2006.01)
*G06F 13/16* (2006.01)
*G09G 5/36* (2006.01)
*G09G 5/395* (2006.01)
*G09G 5/399* (2006.01)

(52) U.S. Cl.
CPC *G06F 12/02* (2013.01); *G06F 5/06* (2013.01); *G06F 13/16* (2013.01); *G06F 13/1642* (2013.01); *G09G 5/36* (2013.01); *G09G 5/395* (2013.01); *G09G 5/399* (2013.01); *G09G 2352/00* (2013.01)

(58) Field of Classification Search
CPC ........... G06F 12/02; G06F 5/06; G06F 13/16; G06F 13/1642; G09G 5/36; G09G 5/395; G09G 5/399; G09G 2352/00
See application file for complete search history.

(56) References Cited

U.S. PATENT DOCUMENTS

2007/0091092 A1   4/2007   Okada

FOREIGN PATENT DOCUMENTS

| JP | 2000-356984 A | 12/2000 |
| JP | 2003-348175 A | 12/2003 |
| JP | 2007-114489 A | 5/2007 |

*Primary Examiner* — Hal Schnee
*Assistant Examiner* — Ramon A Mercado
(74) *Attorney, Agent, or Firm* — Arent Fox LLP

(57) ABSTRACT

A data transfer device includes a FIFO memory and a control unit which obtains a data amount of the FIFO memory to control the FIFO memory and outputs a selection signal corresponding to the obtained data amount of the FIFO memory. An output data generation unit generates output data including either one of the second output data and an interpolation data selected based on the selection signal, and a first output data stored in a frame memory.

8 Claims, 11 Drawing Sheets

Fig.3A

FDA

| D00 | D01 | D02 | D03 | D04 | D05 | D06 | D07 | ~L0 |
|-----|-----|-----|-----|-----|-----|-----|-----|-----|
| D10 | D11 | D12 | D13 | D14 | D15 | D16 | D17 | ~L1 |
| D20 | D21 | D22 | D23 | D24 | D25 | D26 | D27 | ~L2 |
| D30 | D31 | D32 | D33 | D34 | D35 | D36 | D37 | ~L3 |
| D40 | D41 | D42 | D43 | D44 | D45 | D46 | D47 | ~L4 |
| D50 | D51 | D52 | D53 | D54 | D55 | D56 | D57 | ~L5 |
| D60 | D61 | D62 | D63 | D64 | D65 | D66 | D67 | ~L6 |
| D70 | D71 | D72 | D73 | D74 | D75 | D76 | D77 | ~L7 |

| D00 | D02 | D04 | D06 |
|-----|-----|-----|-----|
| D10 | D12 | D14 | D16 |
| D20 | D22 | D24 | D26 |
| D30 | D32 | D34 | D36 |
| D40 | D42 | D44 | D46 |
| D50 | D52 | D54 | D56 |
| D60 | D62 | D64 | D66 |
| D70 | D72 | D74 | D76 |

| D01 | D03 | D05 | D07 |
|-----|-----|-----|-----|
| D11 | D13 | D15 | D17 |
| D21 | D23 | D25 | D27 |
| D31 | D33 | D35 | D37 |
| D41 | D43 | D45 | D47 |
| D51 | D53 | D55 | D57 |
| D61 | D63 | D65 | D67 |
| D71 | D73 | D75 | D77 |

Fig.14A

| D00 | D03 | D06 | D09 | ~FD0 |
|-----|-----|-----|-----|------|
| D10 | D13 | D16 | D19 | |
| D20 | D23 | D26 | D29 | |
| D30 | D33 | D36 | D39 | |
| D40 | D43 | D46 | D49 | |
| D50 | D53 | D56 | D59 | |
| D60 | D63 | D66 | D69 | |

Fig.14B

| D01 | D04 | D07 | D010 | ~FD1 |
|-----|-----|-----|------|------|
| D11 | D14 | D17 | D110 | |
| D21 | D24 | D27 | D210 | |
| D31 | D34 | D37 | D310 | |
| D41 | D44 | D47 | D410 | |
| D51 | D54 | D57 | D510 | |
| D61 | D64 | D67 | D610 | |

Fig.14C

| D02 | D05 | D08 | D011 | ~FD2 |
|-----|-----|-----|------|------|
| D12 | D15 | D18 | D111 | |
| D22 | D25 | D28 | D211 | |
| D32 | D35 | D38 | D311 | |
| D42 | D45 | D48 | D411 | |
| D52 | D55 | D58 | D511 | |
| D62 | D65 | D68 | D611 | |

# DATA TRANSFER DEVICE

CROSS-REFERENCE TO RELATED APPLICATIONS

This application is based upon and claims the benefit of priority from prior Japanese Patent Application No. 2012-182545, filed on Aug. 21, 2012, the entire contents of which are incorporated herein by reference.

FIELD

The present disclosure relates to a data transfer device.

BACKGROUND ART

A conventional electronic device, such as a digital still camera, includes a display unit which displays image data and a data transfer device which transfers the image data from a memory to the display unit. The data transfer device includes a plurality of FIFO (first in first out) memories and manages data transfer from the plurality of memories to the display unit. See, for example, Japanese Laid-Open Patent Publication Nos. 2003-348175 and 2007-114489.

SUMMARY

However, if a processing for reading data from the memory is delayed, the read data may be too late for a transfer timing to the display unit. Such a transfer failure may cause a disturbance of an image displayed on the display unit. Further, the transfer failure may increase a processing load in a processing device (e.g. CPU) other than the data transfer device.

A data transfer device according to one aspect of the present disclosure includes a first storage unit in which first data output from a memory is sequentially stored and from which first output data is output in a sequence corresponding to a storage sequence of the first data, a first control unit which obtains a data amount of the first storage unit and controls the first storage unit according to the data amount of the first storage unit, a second storage unit in which second data output from the memory is sequentially stored and from which second output data is output in a sequence corresponding to a storage sequence of the second data, a second control unit which obtains a data amount of the second storage unit, controls the second storage unit according to the data amount of the second storage unit and outputs a selection signal corresponding to the data amount of the second storage unit, an interpolation data generation unit which generates interpolation data based on the first output data, and an output data generation unit which generates output data including either one of the second output data and the interpolation data selected based on the selection signal, and the first output data.

The object and advantages of the invention will be realized and attained by means of the elements and combinations of particularly pointed out in the claims. It is to be understood that both the foregoing general description and the following detailed description are exemplary and explanatory and are not restrictive of the invention.

BRIEF DESCRIPTION OF DRAWINGS

FIGS. 3A to 3C are diagrams of image data,
FIG. 14A to 14C are diagrams of image data.

DESCRIPTION OF EMBODIMENTS

Figure 1:
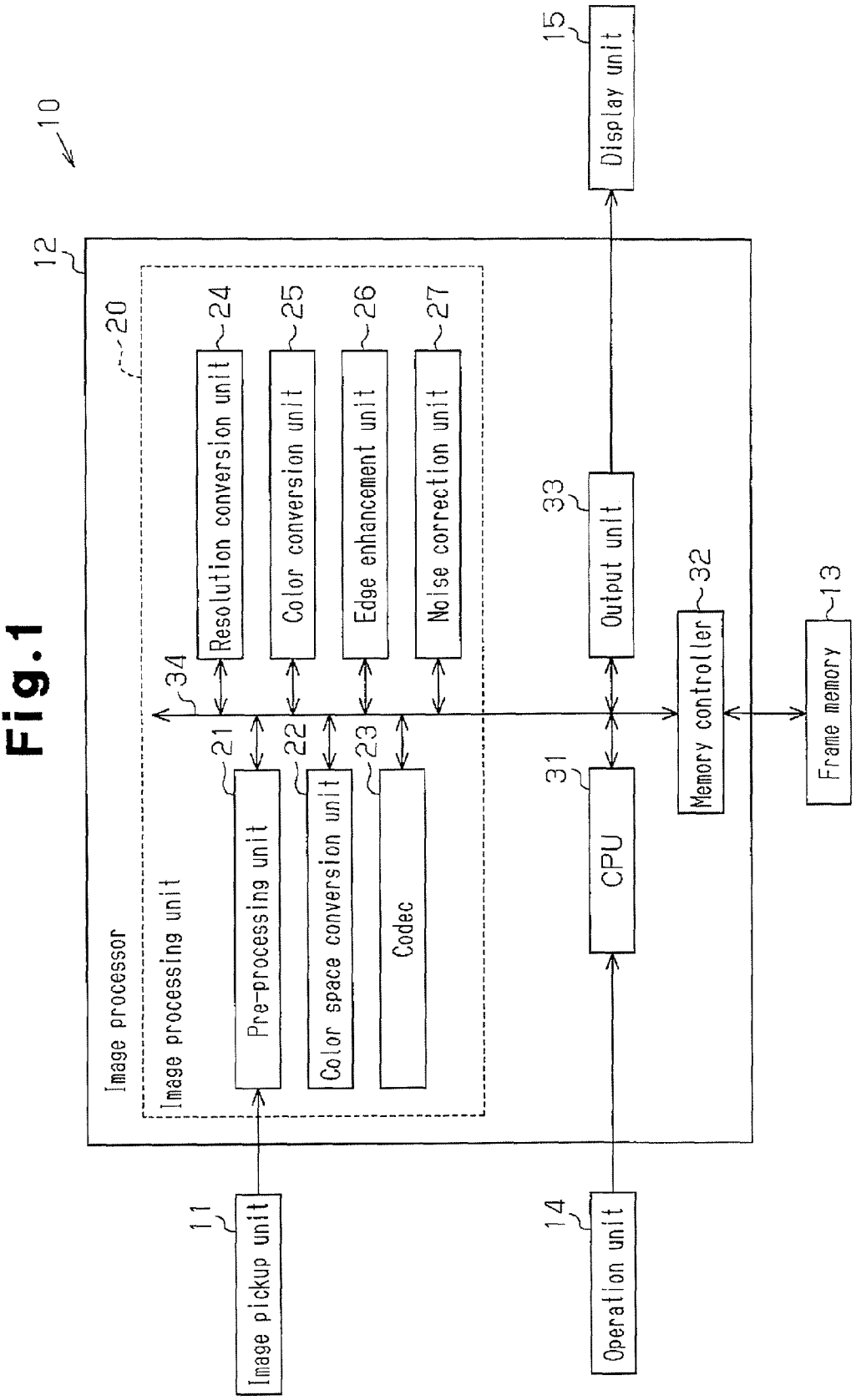
FIG. 1 is a block circuit diagram of an electronic device.

An electronic device 10 according to one embodiment is described below with reference to the accompanying drawings. The electronic device 10 illustrated in FIG. 1 is, for example, a digital still camera. The electronic device 10 includes an image pickup unit 11, an image processor 12, a frame memory 13, an operation unit 14 and a display unit 15. The frame memory 13 may be referred to as a memory.

The image pickup unit 11 includes, for example, image pickup elements, such as as CCDs or CMOS image sensors, and a plurality of image pickup elements are, for example, two-dimensionally arrayed. The image pickup unit 11 outputs image data of one screen (one frame) picked up by the image pickup elements for each frame.

The image processor 12 stores image data input from the image pickup unit 11 in the frame memory 13. The frame memory 13 is a memory with a memory capacity capable of storing a plurality of frames of image data. The frame memory 13 is a rewritable memory such as a synchronized dynamic random access memory (SDRAM). The image processor 12 applies various image processings to image data stored in the frame memory 13. Specifically, the image processor 12 applies various image processings to image data read from the frame memory 13 and stores the processed image data in the frame memory 13.

The operation unit 14 includes various switches to be operated by a user. The operation unit 14 supplies an operation request signal corresponding to the operation of the user, such as the selection of an image to be displayed on the display unit 15, the setting of the processing to be applied to image data stored in the frame memory 13, the setting of photographing conditions or the erasure of image data to the image processor 12. The image processor 12 supplies the image data stored in the frame memory 13 to the display unit 15.

The display unit 15 is utilized as a monitor for confirming a photographed image. The display unit 15 is utilized as a monitor for determining an area (frame) to be photographed. The display unit 15 may be, for example, a liquid crystal display device or an organic EL (Electronic Luminescence) display device. The display unit 15 is an example of a transfer destination.

The image processor 12 includes an image processing unit 20 for processing the image data stored in the frame memory 13. The image processing unit 20 includes a plurality of processing units 21 to 27. Accordingly, the frame memory 13 functions as a common frame memory (working memory) for the plurality of processing units 21 to 27.

Examples of the processing units 21 to 27 are described.
The processing unit 21 is a pre-processing unit that applies one or more pre-processings, such as white balance adjustment, gain adjustment and defect signal correction, to image data input from the image pickup unit 11. The processing unit 22 is a color space conversion unit that converts RGB image data (Bayer data) pre-processed by the processing unit 21 into YCbCr image data. One frame of image data processed by these processing units 21, 22 is stored in the frame memory 13 via a memory controller 32. The processing unit 23 is a codec and reads image data stored in the frame memory 13, encodes the image data in accordance with a predetermined format (e.g. JPEG (Joint Photographic Experts Group) format) and stores the encoded image data (encoded data) in the frame memory 13.

The processing unit 24 is a resolution conversion unit that performs a resolution conversion processing for enlarging or reducing the image size (resolution) of image data. The processing unit 25 is a color conversion unit that performs a color conversion processing for converting the color of image data into sepia color, black and white or the like. The processing unit 26 is an edge enhancement unit that performs an edge enhancement processing for enhancing the outline (edge) of an image on image data. The processing unit 27 is a noise correction unit that performs a noise correction processing for removing noise included in image data. The processing units 21 to 27 included in the image processing unit 20 and the processing contents of the processing units 21 to 27 are examples and the types and processing contents of the processing units included in the image processing unit 20 may be set as appropriate.

The image processor 12 includes a central processing unit (hereinafter, CPU) 31, the memory controller 32 and an output unit 33. The processing units 21 to 27 in the image processing unit 20, the CPU 31, the memory controller 32 and the output unit 33 are connected to each other by a bus 34. The bus 34 includes an address bus, a control bus and a data bus.

The CPU 31 centrally controls various circuits. The CPU 31 stores various pieces of information in registers of the corresponding processing units 21 to 27 and output unit 33 in accordance with operation information input from the operation unit 14. The various pieces of information include photographing conditions, the pixel number of one frame and information necessary for operation in each processing unit 21 to 27 and the output unit 33. Each processing unit 21 to 27 and the output unit 33 operate based on information set at the time of initialization or in accordance with the operation of the operation unit 14.

Each processing unit 21 to 27 and the output unit 33 output a request for access to the frame memory 13. For example, the processing units 21 to 27 output a write request to write data in the frame memory 13. The processing units 22 to 27 output a read request to read data from the frame memory 13. Similarly, the output unit 33 outputs a read request to read image data from the frame memory 13.

The memory controller 32 includes an arbiter 32a for arbitrating access requests to the frame memory 13 supplied from various circuits. For example, the arbiter 32a arbitrates requests competing with each other and output from the processing units 21 to 27 and the output unit 33, for example, in accordance with priorities respectively set for the processing units 21 to 27 and the output unit 33. The arbiter 32a supplies the arbitration result to the processing units 21 to 27 and the output unit 33.

The processing units 21 to 27, the write requests of which were permitted, output a write control signal and data to the frame memory 13. The memory controller 32 stores the data in the frame memory 13 in accordance with the control signal. The processing units 22 to 27 and the output unit 33, the read requests of which were permitted, output a control signal for reading data from the frame memory 13. The memory controller 32 supplies the data read from the frame memory 13 to the processing units 22 to 27 and the output unit 33 as request sources in accordance with the control signals.

The output unit 33 sequentially outputs image data of each frame stored in the frame memory 13 to the display unit 15. As illustrated in FIG. 3A, image data FDA of one frame corresponding to the pixel number of the display unit 15 includes a plurality of (eight in FIG. 3A) line data L0 to L7. The image data FDA is, for example, YCbCr image data. Each line data L0 to L7 includes a plurality of (eight in FIG. 3A) pixel data D. In FIG. 3A, each pixel data D is illustrated as pixel data "DXY" with the position of the row of pixel data arranged in a horizontal direction denoted by X (X=0 to 7) and the position of the column of pixel data arranged in a vertical direction denoted by Y (Y=0 to 7). For example, the pixel data in the first row (X=0) in the image data FDA of one frame are denoted by "D00" to "D07". The pixel data in the first column (Y=0) are denoted by "D00" to "D70".

The image data FDA of one frame is divided into image data FD0 illustrated in FIG. 3B and image data FD1 illustrated in FIG. 3C by a processing unit for storing image data for display to be supplied to the display unit 15 in the frame memory 13. In the following description, these image data may be referred to as divided image data FD0, FD1 to be distinguished from the image data FDA of one frame in some cases. The divided image data FD0, FD1 are an example of block data. The processing unit for storing the image data for display in the frame memory 13 is, for example, the processing unit 24 (resolution conversion unit). The processing unit 24 stores the image data FD0 including the data of pixels in the columns having an even-numbered column number Y and the image data FD1 including the data of pixels in the columns having an odd-numbered column number Y in the image data FDA illustrated in FIG. 3A in the frame memory 13. That is, the processing unit 24 divides the image data FDA into the image data FD0 and the image data FD1. The image data FD0 may be referred to as even column image data and the image data FD1 may be referred to as odd column image data. The image data FD0 is an example of first divided image data. The image data FD1 is an example of second divided image data.

The output unit 33 reads the divided image data FD0 and FD1 from the frame memory 13. The output unit 33 alternately outputs the even column image data and the odd column image data to the display unit 15. In this way, the display unit 15 displays an image corresponding to the image data FDA of one frame.

Figure 4A:
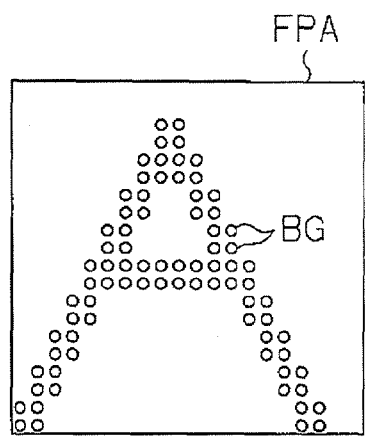
FIGS. 4A to 4C are diagrams of displayed images.
Figure 4B:
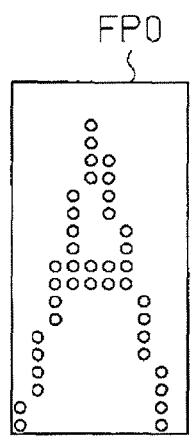
Figure 4C:
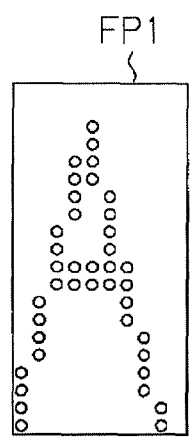

Examples of the image data FDA of one frame and the divided image data FD0, FD1 are illustrated in FIGS. 4A to 4C.

As illustrated in FIG. 4A, an image FPA is an image by the image data FPA of one frame and includes a predetermined character "A" by a plurality of black pixels BG. In the image FPA, pixels other than the black pixels BG are omitted. Contrary to the image FPA, an image FP0 illustrated in FIG. 4B is an image by the even column image data FD0 and an image FP1 illustrated in FIG. 4C is an image by the odd column image data FD1.

Data transfer between the frame memory 13 and the output unit 33 is described.

In response to one read request output from the output unit 33, the frame memory 13 outputs a predetermined amount of data including a request address supplied from the output unit 33 as a first address. Accordingly, the output unit 33 outputs a plurality of read requests. The frame memory 13 outputs the predetermined amount of data in response to each read request. Thus, the image data FD0 stored in the frame memory 13 is transferred from the frame memory 13 to the output unit 33 by a plurality of read requests and the predetermined amount of data in response to each read request.

Similarly, the image data FD1 is transferred from the frame memory 13 to the output unit 33 by a plurality of read requests and the predetermined amount of data in response to each read request. Such data transfer is an example of burst transfer.

Next, the output unit 33 that functions as a data transfer unit or a data transfer device is described.

Figure 2:
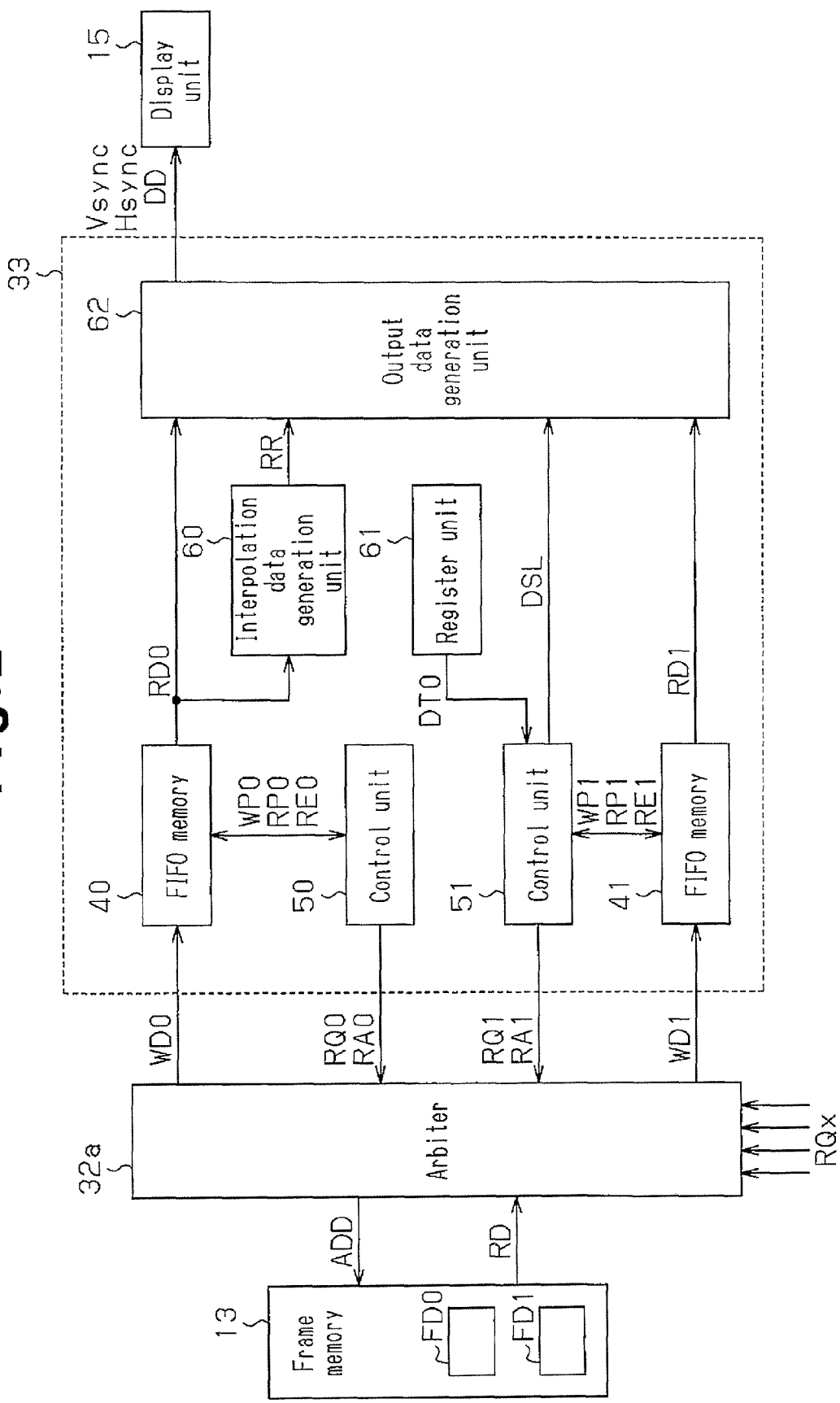
FIG. 2 is a block circuit diagram of an output unit.

As illustrated in FIG. 2, the output unit 33 includes FIFO (first in first out) memories 40, 41, control units 50, 51, an interpolation data generation unit 60, a register unit 61 and an output data generation unit 62. The FIFO memory 40 is an example of a first storage unit. The FIFO memory 41 is an example of a second storage unit.

The FIFO memory 40 stores input data WD0 at a position (address) indicated by a write pointer WP0 and updates the write pointer WP0. The FIFO memory 40 outputs data RD0 at a position (address) indicated by a read pointer RP0 and updates the read pointer RP0. The updating of the write pointer WP0 and the read pointer RP0 is a change to a value indicating a write position or a read position of the next data. The data RD0 is an example of first output data. In the case of sequentially writing or reading data, the FIFO memory 40 adds a predetermined value (e.g. "1") to the value of the pointer WP0 or RP0. The value after the addition is the pointer WP0, RP0 after the updating.

The FIFO memory 40 preferably cyclically manages the write pointer WP0 and the read pointer RP0. For example, the FIFO memory 40 stores one input data WD0 at the position indicated by the write pointer WP0 and updates (+1) the write pointer WP0. The FIFO memory 40 resets (=0) the value of the write pointer WP0 when the value of the write pointer WP0 becomes equal to or larger than a value n (e.g. 512) corresponding to a memory capacity. Thus, the FIFO memory 40 cycles the write pointer WP0 at a value (e.g. 0 to 511) corresponding to the memory capacity.

Similarly, the FIFO memory 40 outputs the data RD0 at a position indicated by the read pointer RP0 and updates the read pointer RP0 (e.g. adds "+1" to the read pointer RP0) to indicate the position of the next read data. The FIFO memory 40 resets (=0) the value of the read pointer RP0 when the value of the read pointer RP0 becomes equal to or larger than a value (e.g. 512) corresponding to a memory capacity. Thus, the FIFO memory 40 cycles the read pointer RP0 at a value (e.g. 0 to 511) corresponding to the memory capacity.

The FIFO memory 40 reads data in response to a read permission signal RE0 of a predetermined level (e.g., H level) supplied from the control unit 50 and stops data readout in response to a read permission single RE0 of another predetermined level (e.g., L level). The FIFO memory 40 outputs the data RD0 in a cycle (e.g. cycle twice as long as that of a clock signal for display) corresponding to a request timing (e.g. clock signal for display) of the display unit 15 whilst the data readout is permitted.

The control unit 50 monitors the data amount of the FIFO memory 40 and controls the writing of data in the FIFO memory 40 based on the write pointer WP0 and the read pointer RP0. The control unit 50 is an example of a first control unit. For example, the control unit 50 calculates the amount of data stored in the FIFO memory 40 based on the value of the write pointer WP0 and that of the read pointer RP0. The data amount represents the number of data, which have not been read yet, out of the data stored in the FIFO memory 40. The control unit 50 calculates the free space (=memory capacity-data amount) of the FIFO memory 40 based on the memory capacity and the data amount of the FIFO memory 40. The control unit 50 compares the calculated free space and the number of data to be transferred from the frame memory 13 to the output unit 33 in response to one read request (burst transfer amount). The control unit 50 outputs a read request RQ0 to the arbiter 32a when the free space becomes equal to or larger than the burst transfer amount.

The arbiter 32a supplies the arbitration result to the control unit 50 upon receiving the read request RQ0 output from the control unit 50. The control unit 50 having received access permission outputs a request address RA0 for reading the divided image data FD0. The request address RA0 is an address for sequentially reading a plurality of pixel data included in the divided image data FD0. The control unit 50 stores the next read address after the request address RA0 is output. That is, the control unit 50 adds the burst transfer amount to the request address RA0 and sets the value of the addition result as the request address RA0.

The arbiter 32a supplies an address ADD based on the request address RA0 and a control signal for readout to the frame memory 13. The frame memory 13 outputs data RD in a memory area having the address ADD as a first address in response to the address ADD and the control signal. The data RD output from the frame memory 13 is supplied as the data WD0 to the FIFO memory 40 of the output unit 33 via the arbiter 32a and the FIFO memory 40 stores the data WD0.

As just described, the control unit 50 monitors the data amount of the FIFO memory 40. The control unit 50 requests the divided image data FD0 (even column image data) stored in the frame memory 13 to the arbiter 32a. The FIFO memory 40 stores the divided image data FD0 read from the frame memory 13 in accordance with the write pointer WP0. The FIFO memory 40 reads stored data in accordance with the read pointer RP0 and outputs the data RD0.

Similarly, the FIFO memory 41 stores input data WD1 at a position (address) indicated by a write pointer WP1 and updates the write pointer WP1. The FIFO memory 41 outputs data RD1 at a position (address) indicated by a read pointer RP1 and updates the read pointer RP1. The output data RD1 is an example of second output data. The FIFO memory 41 cyclically manages the write pointer WP1 and the read pointer RP1.

The control unit 51 monitors the data amount of the FIFO memory 41 based on the write pointer WP1 and the read pointer RP1 and outputs a read request RQ1 according to the monitoring result. The control unit 51 is an example of a second control unit. The control unit 51 outputs the request address RA1 according to the arbitration result of the arbiter 32a. The request address RA1 is an address for reading the divided image data FD1. In this way, the control unit 51 controls the readout of the divided image data FD1 stored in the frame memory 13 and the storage of the divided image data FD1 in the FIFO memory 41.

In this way, the control unit 51 monitors the data amount of the FIFO memory 41. The control unit 51 requests the divided image data FD1 (odd column image data) stored in the frame memory 13 to the arbiter 32a. The FIFO memory 41 stores the divided image data FD1 read from the frame memory 13 in accordance with the write pointer WP1. The FIFO memory 41 reads the stored data in accordance with the read pointer RP1 and outputs the data RD1.

The arbiter 32a adjusts the read requests RQ0, RQ1 output from the control units 50, 51 and requests RQx output from the other processing units 21 to 27 (see FIG. 1) in accordance with the priorities of the respective requests RQ0, RQ1 and RQx. The request RQx is a request supplied to each processing unit 21 to 27. The priority of the read request RQ0 of the control unit 50 is set to be higher than that of the read request RQ1 of the control unit 51. Thus, the arbiter 32a supplies an access permission for the read request RQ0 having a high priority to the control unit 50 when the read request RQ0 of the control unit 50 and the read request RQ1 of the control unit 51 compete.

The control unit 51 monitors the data amount of the FIFO memory 41 and outputs a selection signal DSL having a level corresponding to the data amount. For example, the control unit 51 compares a threshold value DT0 set by the register unit 61 and the data amount of the FIFO memory 41. The control unit 51 outputs a selection signal DSL of a first level (e.g., L level) when the data amount is larger than the threshold value DT0 and outputs a selection signal DSL of a second level (e.g., H level) when the data amount is not larger than the threshold value DT0. The threshold value DT0 set for the FIFO memory 41 is, for example, "−1".

The threshold value DT0 to be compared with the data amount may be, for example, a variable value set according to the transfer state of the image data.

As described above, the data amount of the FIFO memory 41 is calculated based on the value of the write pointer WP1 and that of the read pointer RP1. When the data amount is "0", the value of the write pointer WP1 and the read pointer RP1 are equal to each other.

The data is written in the FIFO memory 41 in accordance with the write pointer WP1 and read from the FIFO memory 41 in accordance with the read pointer RP1. Thus, the write pointer WP1 precedes the read pointer RP1 when the data is normally transferred.

The data stored in the FIFO memory 41 is read from the FIFO memory 41 based on an operation timing of the display unit 15. If readout from the frame memory 13 is delayed, the read pointer RP1 precedes the write pointer WP1 and a transfer failure occurs. The data amount in the event of the transfer failure has a negative value. That is, if the data amount becomes smaller than "0" (zero), a transfer failure occurs. The occurrence of the transfer failure causes a disturbance of a displayed image on the display unit 15. Thus, the control unit 51 monitors the data amount of the FIFO memory 41 and outputs a selection signal DSL of a level corresponding to the transfer state (where a transfer failure can occur or a transfer failure has occurred).

The interpolation data generation unit 60 outputs interpolation data RR generated based on the data RD0 output from the FIFO memory 40. The FIFO memory 40 stores the even column image data FD0 read from the frame memory 13 by the control unit 50. Image data of one frame is necessary for display on the display unit 15. Thus, the interpolation data generation unit 60 generates the interpolation data RR corresponding to the odd column image data FD1 by an interpolation processing based on the output data RD0 of the FIFO memory 40. For example, the interpolation data generation unit 60 generates the interpolation data RR having a value equal to that of the output data RD0 of the FIFO memory 40 by the interpolation processing.

The output data generation unit 62 outputs output data DD based on the data RD0 output from the FIFO memory 40, the data RD1 output from the FIFO memory 41 and the interpolation data RR output from the interpolation data generation unit 60.

The output data generation unit 62 selects either one of the interpolation data RR output from the interpolation data generation unit 60 and the data RD1 output from the FIFO memory 41 in accordance with the selection signal DSL output from the control unit 51. For example, the output data generation unit 62 selects the data RD1 output from the FIFO memory 41 in response to the selection signal DSL of the first level (e.g., L level) and outputs the data RD1 as the output data DD. If the selection signal DSL is of the first level (e.g., L level) in this way, the output data generation unit 62 alternately outputs the data RD0 output from the FIFO memory 40 and the selected data RD1 as the output data DD. On the other hand, the output data generation unit 62 selects the interpolation data RR output from the interpolation data generation unit 60 in response to the selection signal DSL of the second level (e.g., H level) and outputs the interpolation data RR as the output data DD. If the selection signal DSL is of the second level (e.g., H level) in this way, the output data generation unit 62 alternately outputs the data RD0 output from the FIFO memory 40 and the selected interpolation data RR as the output data DD.

The output data generation unit 62 generates synchronization signals for displaying one frame of image on the display unit 15, for example, based on a clock signal. The synchronization signals include a vertical synchronization signal Vsync indicating the start of the frame and a horizontal synchronization signal Hsync indicating the start of each line. Cycles of the respective synchronization signals Vsync, Hsync are set according to the display unit 15. The output data generation unit 62 outputs the output data DD according to the synchronization signals Vsync, Hsync.

Next, functions of the output unit 33 are described.

Figure 6:
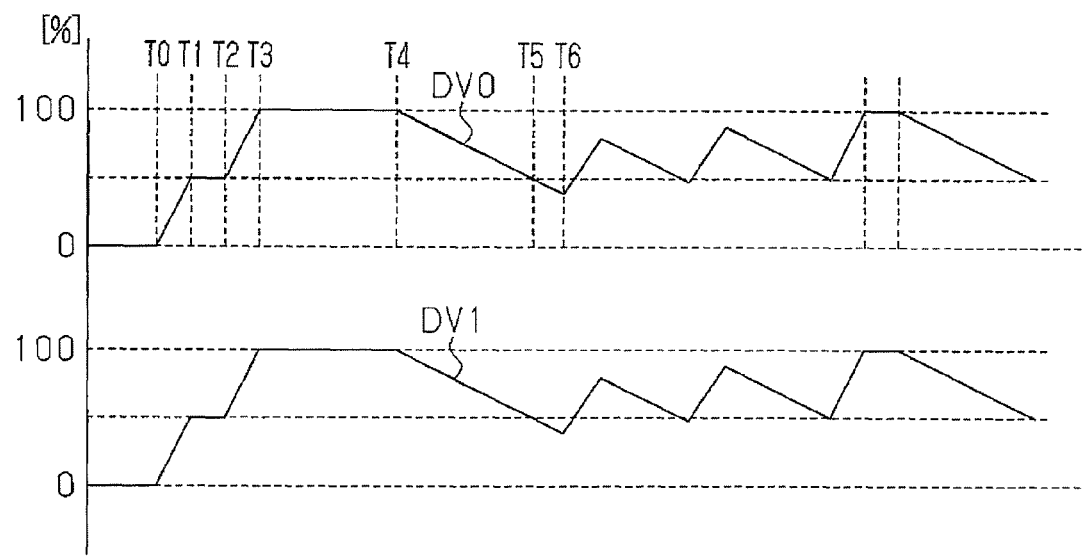
FIG. 6 is an operation explanatory chart of the output unit.

First, transitions of the data amounts of the FIFO memories 40, 41 are described. In FIG. 6, a waveform in an upper stage shows a transition of a data amount DV0 of the FIFO memory 40 and that in a lower stage shows a transition of a data amount DV1 of the FIFO memory 41. In each waveform illustrated in FIG. 6, a horizontal axis represents time and a vertical axis represents data amount (percentage).

The control unit 50 illustrated in FIG. 2 outputs the read request RQ0 requesting data of the divided image data FD0 of the frame memory 13 to the arbiter 32a. The frame memory 13 outputs a predetermined amount of image data corresponding to the read address ADD (RA0) received from the control unit 50 via the arbiter 32a.

When the burst transfer is started (time T0), the transferred image data is stored in the FIFO memory 40, whereby the data amount DV0 of the FIFO memory 40 increases. When the burst transfer is finished (time T1), the control unit 50 illustrated in FIG. 2 judges that data transfer is possible based on the free space calculated based on the data amount DV0 of the FIFO memory 40, and outputs the read request RQ0 to the arbiter 32a. Until the next burst transfer is started (time T2), the data amount DV0 of the FIFO memory 40 does not change unless the data is read. By the data transfer from the frame memory 13 to the FIFO memory 40, the data amount DV0 of the FIFO memory 40 increases and reaches a full state (maximum state and a state where a ratio of the data amount to the memory capacity is "100 [%]") (time T3).

When readout from the FIFO memory 40 is started (time T4), the data amount DV0 of the FIFO memory 40 decreases. When the free space of the FIFO memory 40 becomes larger than the burst transfer amount (time T5), the control unit 50 outputs the read request RQ0 to the arbiter 32a. After the output of the read request RQ0, the data amount DV0 of the FIFO memory 40 decreases until the data transfer between the frame memory 13 and the FIFO memory 40 is started. When the data transfer from the frame memory 13 is started according to the read request RQ0 (time T6), the data amount DV0 of the FIFO memory 40 increases with a gradient corresponding to a difference between a writing speed and a reading speed.

Similarly to the control unit 50, the control unit 51 illustrated in FIG. 2 controls the FIFO memory 41. Accordingly, the data amount DV1 of the FIFO memory 41 transitions similarly to the data amount DV0 of the FIFO memory 40.

Figure 7:
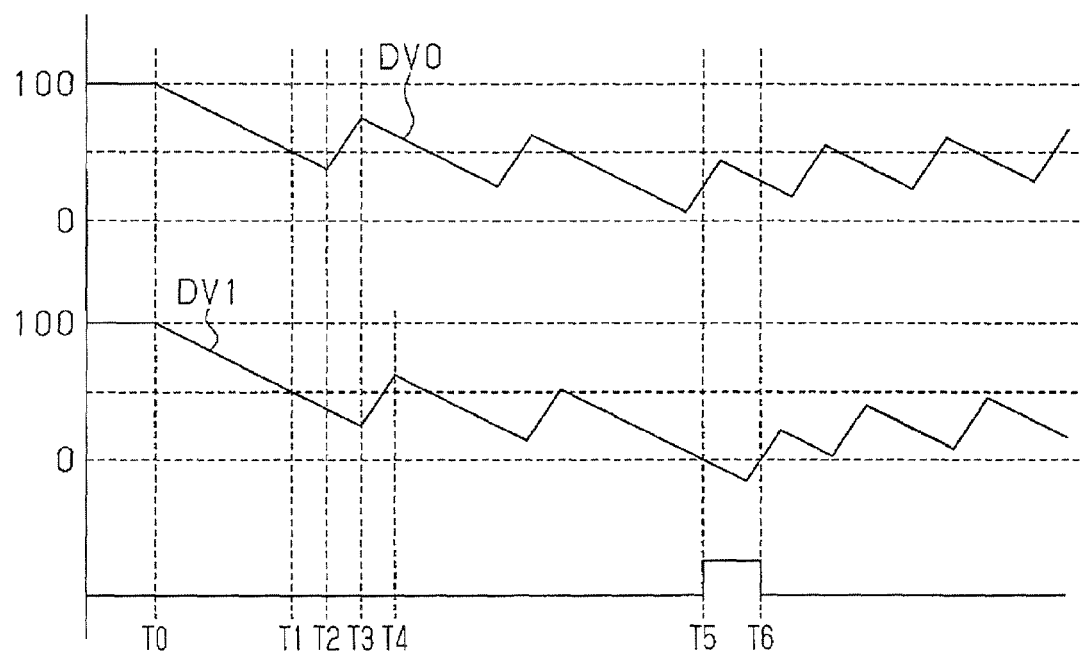
FIG. 7 is an operation explanatory chart of the output unit.

Next, a case where a transfer failure occurs is described. In FIG. 7, a horizontal axis represents time. A vertical axis for waveforms of the data amounts DV0, DV1 illustrated in FIG. 7 represents data amount (percentage).

At time T0, readout from the FIFO memories 40, 41 is started. The control unit 51 illustrated in FIG. 2 outputs a selection signal DSL of L level corresponding to the comparison result of the data amount DV1 and the threshold value DT0. The output data generation unit 62 alternately outputs the data RD0 output from the FIFO memory 40 and the data RD1 output from the FIFO memory 41 as the output data DD based on the selection signal DSL of L level.

The data amounts DV0, DV1 of the both FIFO memories 40, 41 decrease as the image data are read. At time T1, the control unit 50 judges that data transfer is possible based on the free space of the FIFO memory 40 calculated based on the data amount DV0 and outputs the read request RQ0. Similarly, the control unit 51 judges that data transfer is possible based on the free space of the FIFO memory 41 calculated based on the data amount DV1 and outputs the read request RQ1.

Out of the both read requests RQ0, RQ1, the read request RQ0 having a high priority is received. When the data transfer from the frame memory 13 to the FIFO memory 40 is started according to the read request RQ0 (time T2), the data amount DV0 of the FIFO memory 40 increases. Subsequently, the read request RQ1 having a lower priority is received and the data transfer from the frame memory 13 to the FIFO memory 41 is started according to the read request RQ1. In this way, the read request RQ0 of the control unit 50 corresponding to the FIFO memory 40 is preferentially received over the read request RQ1 of the control unit 51 corresponding to the FIFO memory 41.

After the data is written in the FIFO memory 40, the data is written in the FIFO memory 41. Accordingly, a transfer failure occurs in the FIFO memory 41 earlier than in the FIFO memory 40 (time T5). The control unit 51 outputs a selection signal DSL of H level according to the comparison result of the threshold value DT0 and the data amount DV1. The output data generation unit 62 alternately outputs the data RD0 output from the FIFO memory 40 and the interpolation data RR output from the interpolation data generation unit 60 as the output data DD based on the selection signal DSL of H level.

Accordingly, an image by the image data RD0 output from the FIFO memory 40, i.e. the even column image data and the interpolation data RR are displayed on the display unit 15. The interpolation data RR is generated based on the image data RD0 output from the FIFO memory 40. In the present embodiment, the interpolation data generation unit 60 outputs the interpolation data RR having a value equal to that of the output data RD0 of the FIFO memory 40. Thus, the color of the pixels displayed based on the interpolation data RR is equal to that of the pixel adjacent in a horizontal scanning direction (pixel adjacent in an opposite scanning direction along the horizontal scanning direction) on the display unit 15.

In one frame image, two pixels adjacent in the horizontal scanning direction often represent data similar to each other. Accordingly, by displaying the pixel by the interpolation data equal to the image data of one previous pixel in the event of a transfer failure, a sense of discomfort is reduced as compared with the case of displaying a pixel by data having a low relationship due to the transfer failure. In this way, trouble caused by the transfer failure is reduced.

Subsequently, the data transfer to the FIFO memory 41 is started and, when the data amount DV1 of the FIFO memory 41 becomes equal to or larger than "0", the transfer failure is resolved. The control unit 51 outputs a selection signal DSL of L level when the data amount DV1 becomes larger than the threshold value DT0. The output data generation unit 62 alternately outputs the data RD0 output from the FIFO memory 40 and the data RD1 output from the FIFO memory 41 as the output data DD based on the selection signal DSL of L level.

Figure 5A:
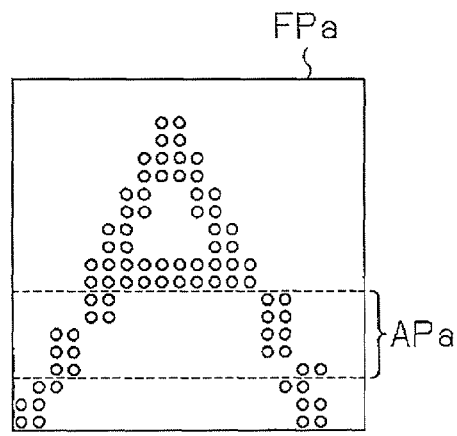
FIGS. 5A, 5B are diagrams of displayed images.
Figure 5B:
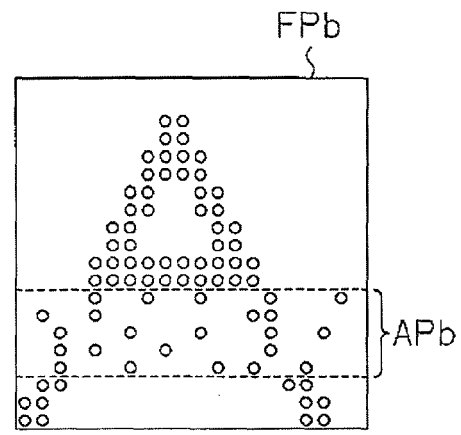

An example of an image displayed on the display unit 15 in this way is illustrated in FIG. 5A. In the image FPa, a case where a transfer failure has occurred is illustrated in an area APa between broken lines. The image FPa gives less sense of discomfort similarly to the image FPA (see FIG. 4A) in the case where no transfer failure occurs, and a character "A" included in the image may be easily recognized. As a comparative example, an image by the image data RD0, RD1 output from the both FIFO memories 40, 41 is illustrated in FIG. 5B. In the image FPb, a transfer failure has occurred in an area APb. As compared with the image FPa illustrated in FIG. 5A, it is difficult to recognize a character included in the image FPb and the image FPb gives more sense of discomfort.

According to the present embodiment, the following effects are achieved.

The output unit 33 includes the FIFO (first in first out) memories 40, 41, the control units 50, 51, the interpolation data generation unit 60, the register unit 61 and the output data generation unit 62. The control unit 50 monitors the data amount of the FIFO memory 40. The control unit 50 requests the divided image data FD0 (even column image data) stored in the frame memory 13 to the arbiter 32a. The FIFO memory 40 stores the divided image data FD0 read from the frame memory 13 in accordance with the write pointer WP0. The FIFO memory 40 reads the stored data in accordance with the read pointer RP0 and outputs the data RD0. The control unit 51 monitors the data amount of the FIFO memory 41. The control unit 51 requests the divided image data FD1 (odd column image data) stored in the frame memory 13 to the arbiter 32a. The FIFO memory 41 stores the divided image data FD1 read from the frame memory 13 in accordance with the write pointer WP1. The FIFO memory 41 reads the stored data in accordance with the read pointer RP1 and outputs the data RD1. The interpolation data generation unit 60 outputs the interpolation data RR generated based on the data RD0 output from the FIFO memory 40. The output data generation unit 62 selects either one of the interpolation data RR output from the interpolation data generation unit 60 and the data RD1 output from the FIFO memory 41 based on the selection signal DSL output from the control unit 51. The output data generation unit 62 outputs the output data DD based on the selected one of the data RD1 and the interpolation data RR, and the data RD0.

If a transfer failure occurs in the FIFO memory 41, the control unit 51 outputs a selection signal DSL of H level. The output data generation unit 62 generates the output data DD based on the data RD0 and the interpolation data RR in response to the selection signal DSL of H level. The interpolation data RR is generated based on the data RD0. Accordingly, two pixels adjacent in the horizontal scanning direction of the display unit 15 are a pixel displayed by the data RD0 and a pixel displayed by the interpolation data RR generated based on the data RD0. Thus, a sense of discomfort is reduced as compared with the case of displaying an image by data having a low relationship due to a transfer failure. In this way, trouble caused by the transfer failure may be reduced.

Next, modifications of the output unit 33 are described. Same reference numerals are given to those components that are the same as the components in the above embodiment. Such components will not be described in detail.

Modification 1

The FIFO memory 41 may be stopped in the event of a transfer failure.

Figure 8:
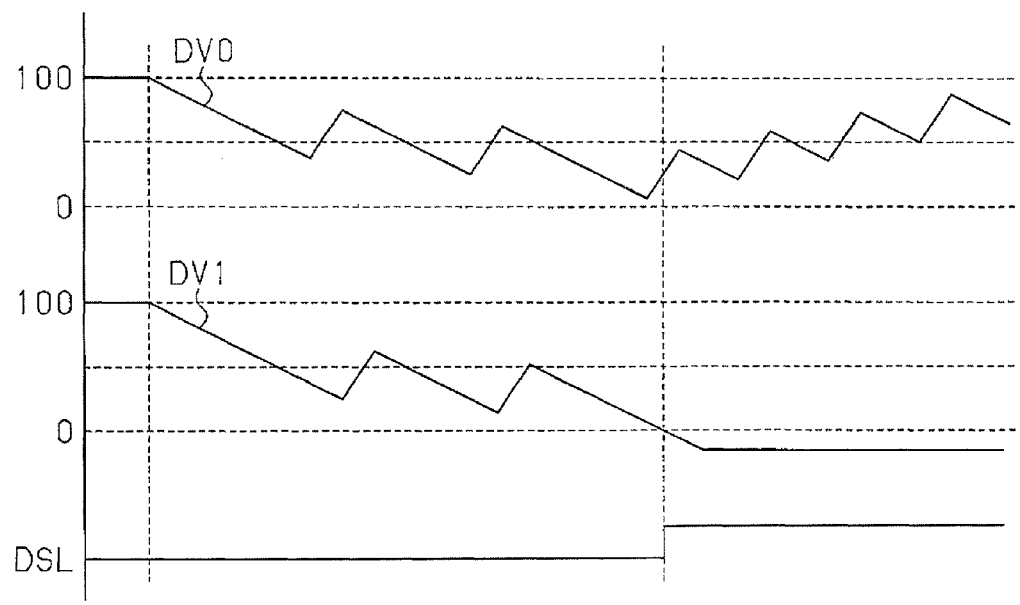
FIG. 8 is an operation explanatory chart of the output unit.

In FIG. 8, a horizontal axis represents time. A vertical axis for waveforms of the data amounts DV0, DV1 illustrated in FIG. 8 represents data amount (percentage).

The control unit 51 outputs a selection signal DSL of H level when judging that a transfer failure has occurred in the FIFO memory 41 according to the comparison result of the data amount DV1 of the FIFO memory 41 and the threshold value DT0. Thereafter, the control unit 51 outputs a read permission signal RE1 of L level at a predetermined timing. The FIFO memory 41 stops data readout in response to the read permission signal RE1 of L level. Further, the control unit 51 stops the output of the read request RQ1 to the arbiter 32a.

By stopping data readout from the FIFO memory 41, the amount of data transferred per unit time, i.e. a transfer band decreases in the data transfer between the frame memory 13 and the image processor 12. The read request RQ0 output by the control unit 50 is more easily received and a response time to the read request RQ0 is shortened. Thus, the occurrence of a transfer failure in the FIFO memory 40 may be suppressed.

Modification 2

The FIFO memory 41 may be stopped in the event of a transfer failure. For example, the threshold value DT1 may be set for the control unit 51 according to the memory capacity of the FIFO memory 41. The threshold value DT1 may be, for example, 5 percent of the memory capacity. The threshold value DT1 may be changed as appropriate.

Figure 9:
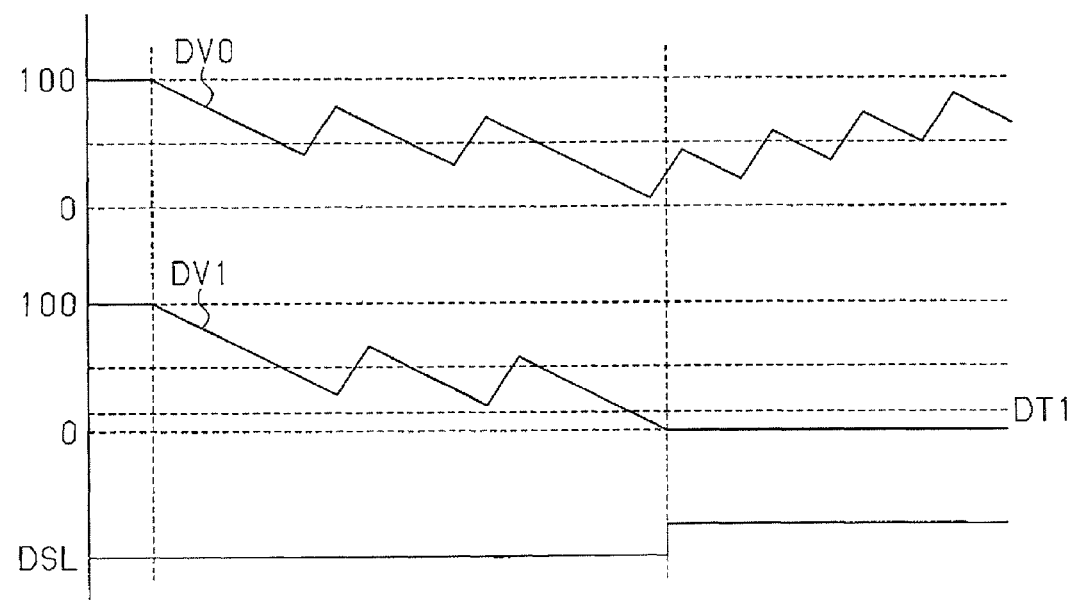
FIG. 9 is an operation explanatory chart of the output unit.

In FIG. 9, a waveform in an upper stage shows a transition of the data amount DV0 of the FIFO memory 40 and that in a lower stage shows a transition of the data amount DV1 of the FIFO memory 41. In FIG. 9, a horizontal axis represents time. A vertical axis for the waveforms of the data amounts DV0, DV1 illustrated in FIG. 9 represents data amount (percentage).

The control unit 51 compares the data amount DV1 of the FIFO memory 41 and the threshold value DT1 and stops the output of the read request RQ1 to the arbiter 32a when the data amount DV1 becomes smaller than the threshold value DT1. Subsequently, when the data amount DV1 of the FIFO memory 41 becomes "0" (zero), the control unit 51 outputs a selection signal DSL of H level and outputs a read permission signal RE1 of L level to the FIFO memory 41. The FIFO memory 41 stops data readout in response to the read permission signal RE1 of L level.

Modification 2 may suppress the occurrence of a transfer failure in the FIFO memory 40 by reducing a transfer band as in modification 1. If the threshold value DT1 is set at a value larger than "0" (zero), the read request RQ1 is stopped at an earlier timing in modification 2 than in modification 1. Since the transfer band decreases before the occurrence of a transfer failure in the FIFO memory 41, the occurrence of a transfer failure in the FIFO memory 40 may be suppressed in modification 2.

Modification 3

Figure 10:
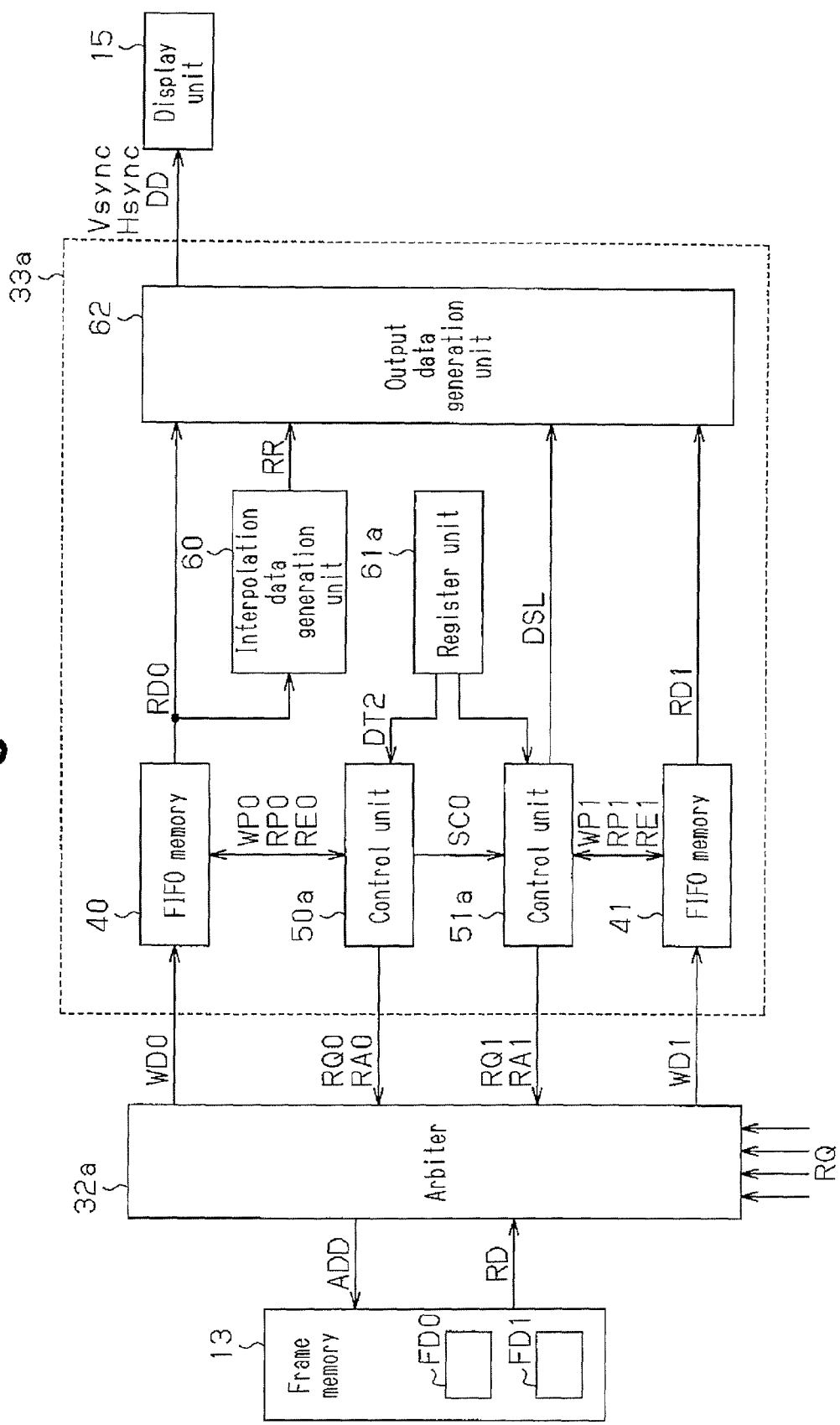
FIG. 10 is a block circuit diagram of another output unit.

The FIFO memory 41 may be stopped according to the data amount DV0 of the FIFO memory 40. For example, as illustrated in FIG. 10, a register unit 61a sets a threshold value DT2 for a control unit 50a of an output unit 33a. The threshold value DT2 is set according to the data amount DV0 of the FIFO memory 40 when a transfer failure occurs in the FIFO memory 41 and, for example, set at 5 percent of the memory capacity of the FIFO memory 40. The threshold value DT2 to be set may be changed as appropriate.

Figure 11:
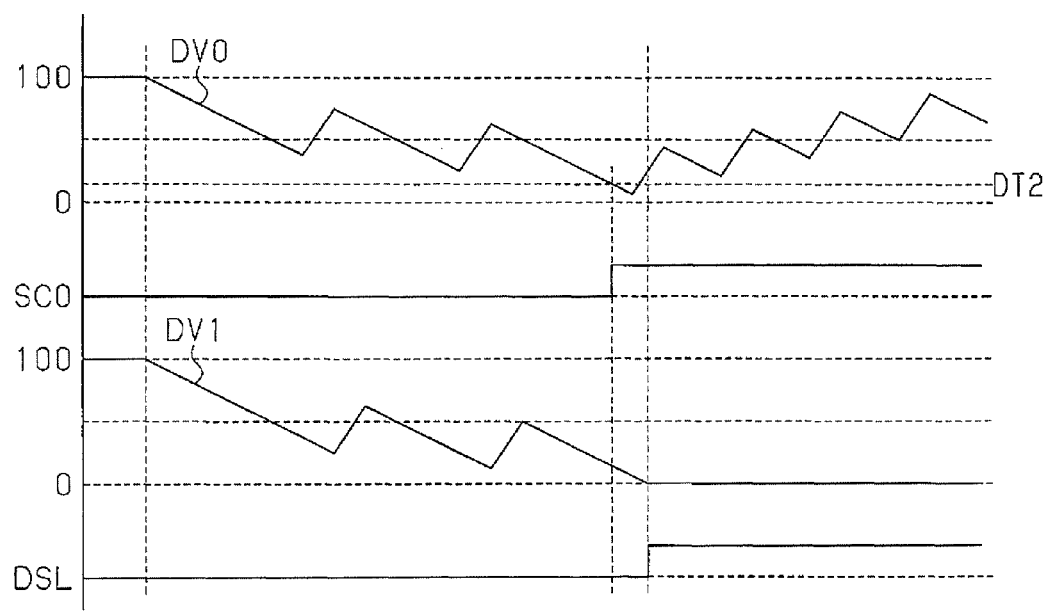
FIG. 11 is an operation explanatory chart of the output unit.

The control unit 50a compares the data amount DV0 of the FIFO memory 40 and the threshold value DT2 and outputs a control signal SC0 according to the comparison result. The control signal SC0 is an example of a first control signal. As illustrated in FIG. 11, the control unit 50a outputs the control signal SC0 of a first level (e.g., L level) when the data amount DV0 is not smaller than the threshold value DT2. In FIG. 11, a horizontal axis represents time. A vertical axis for waveforms of the data amounts DV0, DV1 illustrated in FIG. 11 represents data amount (percentage). The control unit 50a outputs a control signal SC0 of H level when the data amount DV0 becomes smaller than the threshold value DT2 (time T0).

The control unit 51a controls the FIFO memory 41 in response to the control signal SC0 and outputs a selection signal DSL. For example, the control unit 51a permits data readout from the FIFO memory 41 (e.g. outputs a read permission signal RE1 of H level) in response to the control signal SC0 of L level and outputs a selection signal DSL of L level. The control unit 51a stops data readout from the FIFO memory 41 (e.g. outputs a read permission signal RE1 of L level) in response to the control signal SC0 of H level and outputs a selection signal DSL of H level.

Modification 4

After the FIFO memory 41 is stopped, the FIFO memory 41 may be operated according to the data amount DV0 of the FIFO memory 40.

Figure 12:
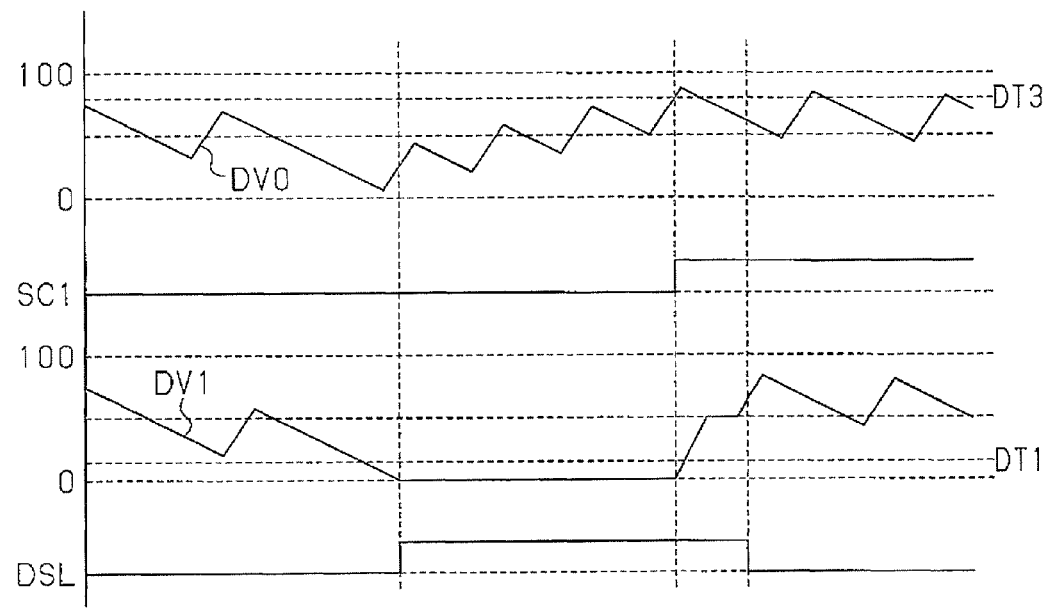
FIG. 12 is an operation explanatory chart of the output unit.

For example, a threshold value DT3 is set for the control unit 50a illustrated in FIG. 10. As illustrated in FIG. 12, the threshold value DT3 is set, for example, at 90 percent of the memory capacity of the FIFO memory 40 according to the data amount DV0 of the FIFO memory 40. In FIG. 12, a horizontal axis represents time. A vertical axis for waveforms of the data amounts DV0, DV1 illustrated in FIG. 12 represents data amount (percentage).

In an example illustrated in FIG. 12, the control unit 51a controls the operation of the FIFO memory 41 according to the comparison result of the set threshold value DT3 and the data amount DV1 and outputs a selection signal DSL.

The control unit 50a outputs a control signal SC1 of L level when the data amount DV0 is smaller than the threshold value DT3. The control signal SC1 is an example of a second control signal. The control unit 50a outputs a control signal SC1 of H level when the data amount DV0 is not smaller than the threshold value DT3. The control unit 50a outputs position information of data written in the FIFO memory 40. The position information of the data is, for example, the positions of pixels displayed according to the data and includes pixel positions in a horizontal scanning direction on the display unit 15 illustrated in FIG. 2. The position information may include pixel positions in a vertical scanning direction on the display unit 15.

The control unit 51a supplies a read request RQ1 to the arbiter 32a in response to the control signal SC1 of H level. At this time, the FIFO memory 40 is a state close to a full state and the data amount DV0 of the FIFO memory 40 has a value close to 100%. The read request RQ0 output by the control unit 50a is in a state easily received by the arbiter 32a. Thus, the read request RQ1 output by the control unit 51a is also easily received.

When the read request RQ1 is received, the control unit 51a outputs a request address RA1 corresponding to the position information received from the control unit 50a. For example, the control unit 51a outputs the request address RA1 to read the burst transferred data using the address of pixel data adjacent to the pixel of the data written in the FIFO memory 40 in the image data FDA of one frame as a first address.

Data transfer from the frame memory 13 to the FIFO memory 41 is started according to the read request RQ1 and the data amount DV1 of the FIFO memory 41 increases.

The control unit 51a starts readout from the FIFO memory 41 at a timing at which the data corresponding to the above position information is read from the FIFO memory 40 and outputs a selection signal SDL of L level.

A timing at which the control unit 51a resumes readout from the FIFO memory 41 may be set as appropriate. For example, data (data of an adjacent pixel) corresponding to the data to be transferred to the FIFO memory 40 by the next burst transfer may be read from the frame memory 13 based on the position information of the data written in the FIFO memory 40 and the data transfer may be resumed from that data. The data transfer may be resumed from line data next to or a plurality of lines ahead of the line data including the image data RD0 to be read from the FIFO memory 40. The data transfer may be resumed from the image data of the next frame.

Modification 5

Figure 13:
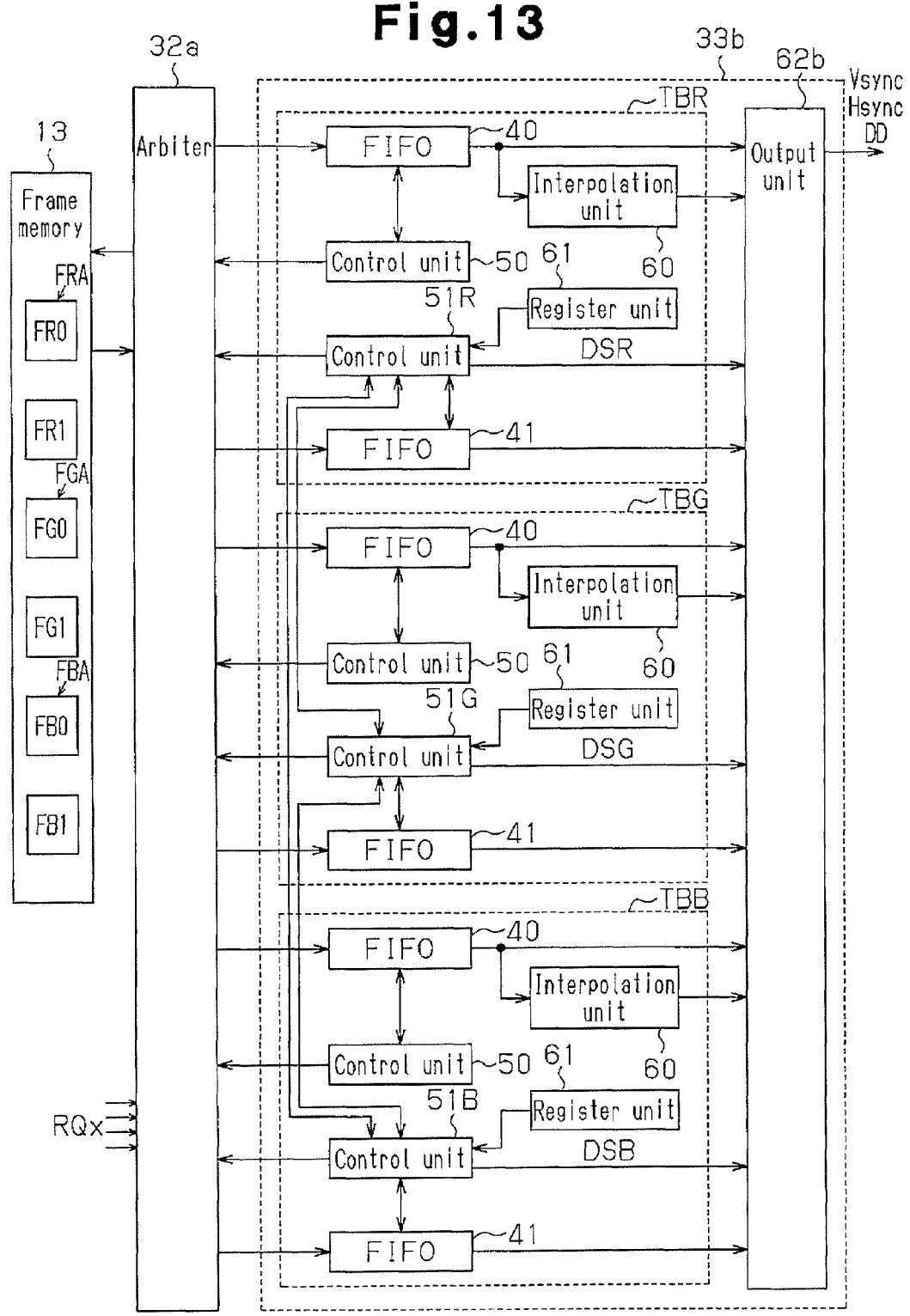
FIG. 13 is a block circuit diagram of another output unit.

As illustrated in FIG. 13, red (R) image data FRA, green (G) image data FGA and blue (B) image data FBA are stored in the frame memory 13. The red image data FRA includes even column image data FR0 and odd column image data FR1. Similarly, the green image data FGA includes even column image data FG0 and odd column image data FG1 and the blue image data FBA includes even column image data FB0 and odd column image data FB1.

An output unit 33b includes a transfer block TBR corresponding to the red image data FRA, a transfer block TBG corresponding to the green image data FGA, a transfer block TBB corresponding to the blue image data FBA and an output data generation unit (simply written as "output unit") 62b.

Similarly to the above output unit 33, the transfer block TBR includes FIFO memories (simply written as "FIFO") 40, 41, control units 50, 51R, an interpolation data generation unit (simply written as "interpolation unit") 60 and a register unit 61. Similarly, the transfer block TBG includes FIFO memories (simply written as "FIFO") 40, 41, control units 50, 51G, an interpolation data generation unit (simply written as "interpolation unit") 60 and a register unit 61. The transfer block TBB includes FIFO memories (simply written as "FIFO") 40, 41, control units 50, 51B, an interpolation data generation unit (simply written as "interpolation unit") 60 and a register unit 61.

Similarly to the control unit 50 of FIG. 2, the control units 51R, 51G and 51B compare a data amount DV1 of the FIFO memory 41 and a threshold value. Each control unit 51R, 51G, 51B outputs a selection signal DSR, DSG, DSB based on the comparison result thereof and the comparison results of the other control units. For example, if a transfer failure occurs in the FIFO memory 41 of the transfer block TBR, the control unit 51R stops the FIFO memory 41 and outputs a selection signal DSR of H level, for example, as in modification 1. The control unit 51R notifies the occurrence of the transfer failure to the other control units 51G, 51B. Each control unit 51G, 51B stops the FIFO memory 41 upon receiving the notification and outputs a selection signal DSG, DSB of H level. The same holds true also when a transfer failure occurs in the other transfer blocks TBG, TBB.

If a transfer failure occurs in one transfer block (e.g. transfer block TBR), there is a high possibility that a transfer failure also occurs in the other transfer blocks TBG, TBB. By stopping the FIFO memory 41 in the transfer block TBR and also stopping the FIFO memories 41 in the other transfer blocks TBG, TBB when a transfer failure occurs in one transfer block TBR, transfer bands may be reduced. Thus, the occurrence of a transfer failure in the FIFO memory 40 of each transfer block TBR to TBB may be suppressed.

The setting of threshold values for stopping the FIFO memories 41 and the like may be performed in the same way as in each modification.

Similarly to modification 4, the data transfer using the FIFO memories 41 may be resumed. In this case, the transfer is resumed when a condition to resume the transfer (data amount DV0 of the FIFO memory 40 is not smaller than the threshold value DT3) is satisfied in all the transfer blocks TBR to TBB.

The data transfer may be similarly controlled also when two image data or four or more image data are stored in the frame memory 13.

Modification 6

As illustrated in FIGS. 14A to 14C, three divided image data FD0 to FD2 may be stored in the frame memory 13 illustrated in FIG. 1 and each of the divided image data FD0 to FD2 may be transferred. The divided image data FD0 illustrated in FIG. 14A includes image data having a column number Y of 3n (n is an integer not smaller than 0). The divided image data FD1 illustrated in FIG. 14B includes image data having a column number Y of 3n+1. The divided image data FD2 illustrated in FIG. 14C includes image data having a column number Y of 3n+2.

In this way, a disturbance of a displayed image due to a transfer failure may be reduced as in the above embodiment and modifications also in the case of transferring the three divided image data FD0 to FD2.

Modification 7

Figure 15A:
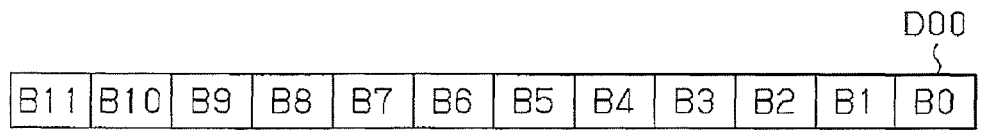
FIGS. 15A to 15E are diagrams of image data.
Figure 15B:
Figure 15C:
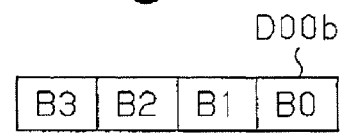
Figure 15D:
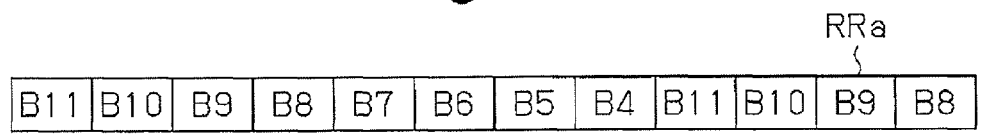
Figure 15E:
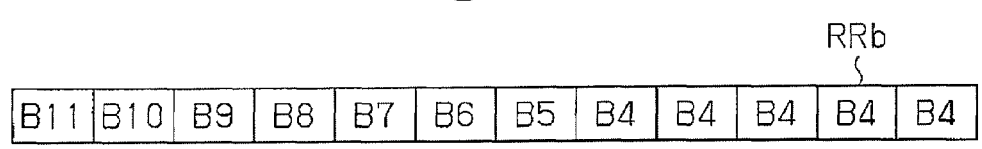

Divided image data obtained by dividing image data using a bit number may be used. For example, as illustrated in FIG. 15A, one pixel data D00 is composed of data B11 to B0 of 12 bits. The pixel data D00 is divided into divided data D00a composed of upper 8 bits and divided data D00b composed of lower 4 bits as illustrated in FIG. 15B. In the interpolation processing in the interpolation data generation unit 60 (see FIG. 2), interpolation data RRa of 12 bits, the lower 4 bits of which are four bits included in the divided data D00a (e.g. bits B11 to B8), is generated as illustrated in FIG. 15D. As illustrated in FIG. 15E, interpolation data RRb of 12 bits is generated by copying the bit B4 to the lower 4 bits. Fixed data of, e.g. "0" or "1" or the value of an arbitrary bit may be used as a value to be added to the lower 4 bits.

Although the pixel data D00 and the interpolation data RRa, RRb of 12 bits are described in FIGS. 15A to 15D, the bit number may be changed as appropriate. For example, image data of 8 bits is divided into upper 4 bits and lower 4 bits, image data of 10 bits is divided into upper 8 bits and lower 2 bits or image data of 16 bits is divided into upper 8 bits and lower 8 bits. One image data may be divided into three or more.

Such division using the bit number may also be applied, for example, to the even column image data and odd column image data of the above embodiment. That is, each of the image data of the even column image data FD0 illustrated in FIG. 3B is divided into divided image data including upper bits and divided image data including lower bits. Similarly, each of the image data of the odd column image data FD1 illustrated in FIG. 3C is divided into divided image data including upper bits and divided image data including lower bits.

The above embodiment and modifications may be changed as follows.

The interpolation processing in the interpolation data generation unit may be changed as appropriate.

In the case of the even column image data FD0 and the odd column image data FD1 obtained by dividing the image data FD0 of one frame in accordance with the array of the pixel data, interpolation data may be generated by linear interpolation. For example, pixel data (interpolation data corresponding to the pixel data D01 illustrated in FIG. 3A) between the pixel data D00 and D02 included in the even column image data FD0 illustrated in FIG. 3B is generated. The value of the interpolation data is, for example, an average value of the values of the pixel data D00 and D02. In this case, the color of a pixel displayed based on the interpolation data RR is an intermediate color between two pixels adjacent in the horizontal scanning direction on the display unit 15. Thus, an image with less sense of discomfort is obtained as compare with the case of generating the interpolation data RR having a value equal to the value of the even column image data FD0.

In the output unit 33, a correction processing may be performed on image data. The correction processing is, for example, a gradation correction processing. The gradation correction processing based on a display characteristic of the display unit 15 is performed on output data generated in the output data generation unit 62, 62b, and input image data is so corrected that gradation (luminance and color) linearly changes according to the input image data. The corrected image data is output to the display unit 15. The correction processing may be performed in the output data generation unit 62, 62b.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data transfer device, comprising:
a first storage unit in which first data output from a memory is sequentially stored and from which first output data is output in a sequence corresponding to a storage sequence of the first data;
a first control unit which obtains a data amount of the first storage unit and controls the first storage unit according to the data amount of the first storage unit;
a second storage unit in which second data output from the memory is sequentially stored and from which second output data is output in a sequence corresponding to a storage sequence of the second data;
a second control unit which obtains a data amount of the second storage unit, controls the second storage unit according to the data amount of the second storage unit and outputs a selection signal corresponding to the data amount of the second storage unit;
an interpolation data generation unit which generates interpolation data based on the first output data; and
an output data generation unit which alternately outputs the first output data and the second output data when the selection signal is of a first level and alternately outputs the first output data and the interpolation data when the selection signal is of a second level.

2. The data transfer device according to claim 1, wherein
the data transfer device is connected to an arbiter for arbitrating access to the memory,
the first control unit outputs a first read request for reading the first data to the arbiter,
the second control unit outputs a second read request for reading the second data to the arbiter, and
the first read request has a higher priority than that of the second read request.

3. The data transfer device according to claim 1, wherein the second control unit stops the second storage unit based on the data amount of the second storage unit.

4. The data transfer device according to claim 1, wherein
the first control unit outputs a first control signal based on the data amount of the first storage unit, and
the second control unit stops the second storage unit in response to the first control signal.

5. The data transfer device according to claim 3, wherein
the first control unit outputs a second control signal based on the data amount of the first storage unit, and
the second control unit resumes the operation of the second storage unit in response to the second control signal after stopping the second storage unit.

6. A data transfer device that transfers a plurality of block data stored in a memory to a transfer destination, each of the plurality of block data being divided into a plurality of divided data and stored in the memory, the data transfer device comprising:
a plurality of transfer blocks corresponding to the plurality of block data; and
an output data generation unit which generates output data corresponding to the transfer destination in accordance with output signals of the plurality of transfer blocks, wherein each transfer block includes
a first storage unit in which first data output from the memory is sequentially stored and from which first output data is output in a sequence corresponding to a storage sequence of the first data,
a first control unit which obtains a data amount of the first storage unit and controls the first storage unit according to the data amount of the first storage unit,
a second storage unit in which second data output from the memory is sequentially stored and from which second output data is output in a sequence corresponding to a storage sequence of the second data,
a second control unit which obtains a data amount of the second storage unit, controls the second storage unit according to the data amount of the second storage unit and outputs a selection signal corresponding to the data amount of the second storage unit, and
an interpolation data generation unit which generates interpolation data based on the first output data,
wherein the second control units of the plurality of transfer blocks output the selection signals according to mutual notifications thereof, and the output data generation unit alternately outputs, to the transfer destination, the first output data and the second output data when the selection signal is of a first level and alternately outputs the first output data and the interpolation data when the selection signal is of a second level.

7. A method of transferring data stored in a memory to a transfer destination, the method comprising:
sequentially storing first data output from the memory in a first storage unit and outputting first output data from the first storage unit in a sequence corresponding to a storage sequence of the first data;
controlling the first storage unit according to a data amount of the first storage unit;
sequentially storing second data output from the memory in a second storage unit and outputting second output data from the second storage unit in a sequence corresponding to a storage sequence of the second data;
generating a selection signal corresponding to a data amount of the second storage unit;
generating interpolation data based on the first output data; and
generating output data including alternately outputting the first output data and the second output data when the selection signal is of a first level and alternately outputting the first output data and the interpolation data when the selection signal is of a second level.

8. A semiconductor device, comprising:
a plurality of processing units that access a memory;
a data transfer unit which transfers data stored in the memory to a transfer destination; and
an arbiter which arbitrates a plurality of request signals respectively output from the plurality of processing units and the data transfer unit to access the memory,
wherein the data transfer unit includes
a first storage unit in which first data output from a memory is sequentially stored and from which first output data is output in a sequence corresponding to a storage sequence of the first data;
a first control unit which obtains a data amount of the first storage unit and controls the first storage unit according to the data amount of the first storage unit;
a second storage unit in which second data output from the memory is sequentially stored and from which second output data is output in a sequence corresponding to a storage sequence of the second data;
a second control unit which obtains a data amount of the second storage unit, controls the second storage unit according to the data amount of the second storage unit and outputs a selection signal corresponding to the data amount of the second storage unit;
an interpolation data generation unit which generates interpolation data based on the first output data; and
an output data generation unit which alternately outputs the first output data and the second output data when the selection signal is of a first level and alternately outputs the first output data and the interpolation data when the selection signal is of a second level.

* * * * *